US011657131B2

(12) United States Patent
Sahoo

(10) Patent No.: US 11,657,131 B2
(45) Date of Patent: May 23, 2023

(54) BIOMETRIC UNIQUE COMBINATION IDENTIFICATION SYSTEM

(71) Applicant: Sambit Sahoo, Odisha (IN)

(72) Inventor: Sambit Sahoo, Odisha (IN)

(*) Notice: Subject to any disclaimer, the term of this patent is extended or adjusted under 35 U.S.C. 154(b) by 124 days.

(21) Appl. No.: 15/548,775

(22) PCT Filed: Nov. 9, 2016

(86) PCT No.: PCT/IN2016/050392
§ 371 (c)(1),
(2) Date: Aug. 4, 2017

(87) PCT Pub. No.: WO2017/195211
PCT Pub. Date: Nov. 16, 2017

(65) Prior Publication Data
US 2019/0057201 A1    Feb. 21, 2019

(30) Foreign Application Priority Data
May 11, 2016 (IN) .............................. 201631016385

(51) Int. Cl.
*G06F 21/32* (2013.01)
*G06K 9/00* (2006.01)
*H04L 29/06* (2006.01)
*G06Q 20/10* (2012.01)
*G06Q 20/40* (2012.01)
(Continued)

(52) U.S. Cl.
CPC ......... *G06F 21/32* (2013.01); *G06K 9/00892* (2013.01); *G06Q 20/1085* (2013.01); *G06Q 20/4014* (2013.01); *G06Q 20/40145* (2013.01); *G06Q 50/26* (2013.01); *H04L 9/3231* (2013.01); *H04L 63/0861* (2013.01)

(58) Field of Classification Search
CPC .... G06F 21/32; G06K 9/00892; G06Q 20/40; G06Q 20/40145
USPC ....................................................... 705/44
See application file for complete search history.

(56) References Cited

U.S. PATENT DOCUMENTS 5,764,789 A * 6/1998 Pare, Jr. .................. G06F 21/32
382/115
5,805,719 A * 9/1998 Pare, Jr. .................. G06F 21/32
382/115
(Continued)

FOREIGN PATENT DOCUMENTS

JP       2007183720 A  *  7/2007

*Primary Examiner* — Namrata Boveja
*Assistant Examiner* — Amit Patel

(57) ABSTRACT

This invention relates to Banking, National Security and Governance with BIOMETRIC UNIQUE COMBINATION IDENTIFICATION SYSTEM and in particular, this invention relates to Banking, National Security and Governance with BIOMETRIC UNIQUE COMBINATION IDENTIFICATION SYSTEM which will provide paperless, fraud less, ultra secure, convenient, cheap, fast, affordable banking, enhance National Security and provide good governance to all since it will completely eradicate the possibility of having more than one identity. Furthermore, this invention also relates to Banking, National Security and Governance with BIOMETRIC UNIQUE COMBINATION IDENTIFICATION SYSTEM which has the advantages of being simple in structure and convenient to use and install, improving the filling efficiency, reducing manual costs and the like.

2 Claims, 10 Drawing Sheets

(51) Int. Cl.
*G06Q 50/26* (2012.01)
*H04L 9/32* (2006.01)
*H04L 9/40* (2022.01)

(56) References Cited

U.S. PATENT DOCUMENTS

| | | | | |
|---|---|---|---|---|
| 8,773,239 B2* | 7/2014 | Phillips | G06K 9/0002 | |
| | | | 340/5.82 | |
| 9,152,960 B2* | 10/2015 | Chetal | G06K 9/00892 | |
| 2002/0010857 A1* | 1/2002 | Karthik | G06F 21/32 | |
| | | | 713/168 | |
| 2003/0023858 A1* | 1/2003 | Banerjee | H04L 9/3247 | |
| | | | 713/189 | |
| 2003/0105725 A1* | 6/2003 | Hoffman | G06F 21/32 | |
| | | | 705/75 | |
| 2007/0087756 A1* | 4/2007 | Hoffberg | G06Q 10/0631 | |
| | | | 455/450 | |
| 2007/0183633 A1* | 8/2007 | Hoffmann | G06K 9/00221 | |
| | | | 382/116 | |
| 2007/0239614 A1* | 10/2007 | Tannenbaum | G06Q 20/12 | |
| | | | 705/53 | |
| 2009/0075339 A1* | 3/2009 | Kohler | C07K 16/2803 | |
| | | | 435/69.6 | |
| 2009/0079539 A1* | 3/2009 | Johnson | G06K 9/00885 | |
| | | | 340/5.83 | |
| 2011/0320037 A1* | 12/2011 | Frugone | G06Q 20/40 | |
| | | | 700/237 | |
| 2012/0076366 A1* | 3/2012 | Molina | G06K 9/0053 | |
| | | | 382/117 | |
| 2013/0265136 A1* | 10/2013 | Wadia | G07F 19/201 | |
| | | | 340/5.53 | |
| 2015/0317637 A1* | 11/2015 | Kuribara | G06Q 20/40145 | |
| | | | 705/43 | |
| 2016/0225278 A1* | 8/2016 | Leddy | G09B 5/06 | |
| 2018/0189773 A1* | 7/2018 | Tanaka | G06Q 20/322 | |

* cited by examiner

Red light will glow, Siren will ring & access will be denied

Green Light will glow, allow access

Perspective view of Outdoor BUCIS Authorizer (OBA)

After expiry of visa or permit of the tourist on authorization Red light will glow, Siren will ring & access will be denied.

Creation of BUCIS of a foreign tourist at entry point.

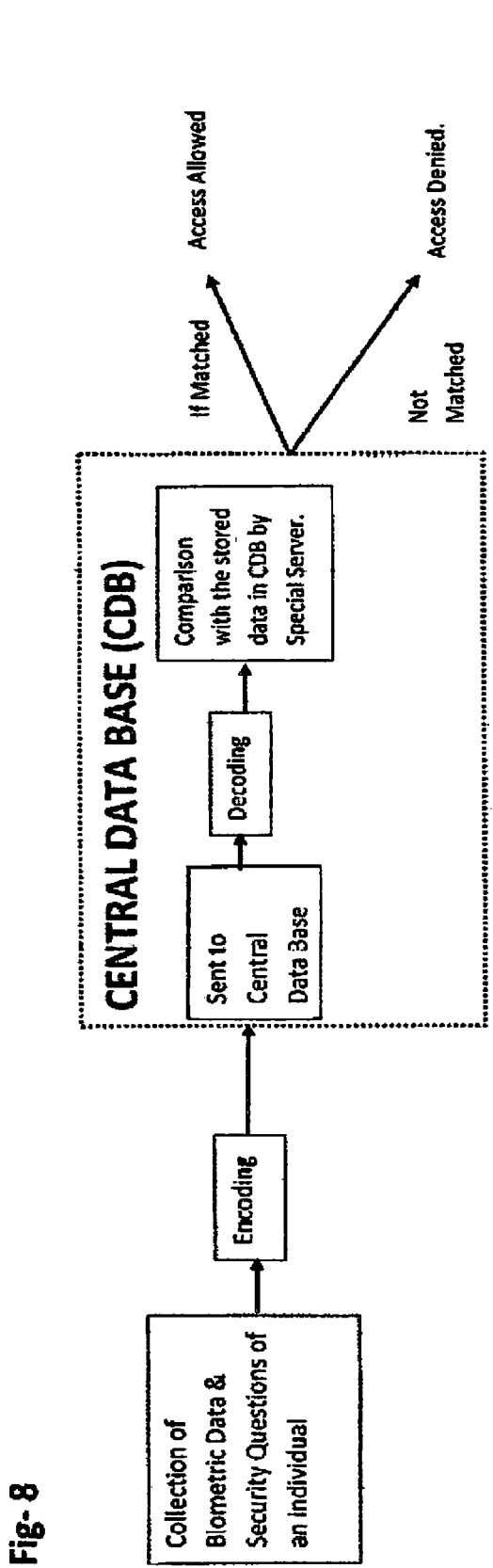

BIOMETRIC UNIQUE COMBINATION IDENTIFICATION SYSTEM

FIELD OF THE INVENTION

This invention relates to Banking, National Security and Governance with BIOMETRIC UNIQUE COMBINATION IDENTIFICATION SYSTEM and in particular, this invention relates to Banking, National Security and Governance with BIOMETRIC UNIQUE COMBINATION IDENTIFICATION SYSTEM which will provide paperless, fraud less, ultra secure, convenient, cheap, fast, affordable banking, enhance National Security and provide good governance to all since it will completely eradicate the possibility of having more than one identity. Furthermore, this invention also relates to Banking, National Security and Governance with BIOMETRIC UNIQUE COMBINATION IDENTIFICATION SYSTEM which has the advantages of being simple in structure and convenient to use and install, improving the filling efficiency, reducing manual costs and the like.

BACKGROUND OF THE INVENTION AND THE RELATED PRIOR ART

Identification of humans is a goal as ancient as humanity itself. As technology and services have developed in the modern world, human activities and transactions have proliferated in which rapid and reliable personal identification is required such as Banking, National security & Governance. Now days with increase in identity fraud, inconvenience and unacceptability by illiterates, lots of paperwork, the loss of card, cheque, and bonds are a major cause of worry. Memorising passwords, carrying cards, cheques, signature mismatch, requesting the banks for blocking the stolen or lost cards, cheque, bonds and a whole lot of other problem calls for a new and efficient way of banking that is BANKING with BIOMETRIC UNIQUE COMBINATION IDENTIFICATION SYSTEM which is highly secure, safe, paperless, easy and efficient. A National Universal ID BIOMETRIC UNIQUE COMBINATION IDENTIFICATION SYSTEM is a critical necessity which is very essential for inclusive growth of all citizens by better implementation of schemes. BIOMETRIC UNIQUE COMBINATION IDENTIFICATION SYSTEM will help in proper monitoring and execution of these schemes. Citizens can access better Government to Citizens services being provided for the betterment of citizens and the nation as a whole example include driving license, and voter's ID card, employment in government organization, Employees Provident Fund, access employment opportunities in government and private entities, passport control, computer login control, bank automatic teller machines and other transactions authorization, premises access control, and security systems generally. By using BIOMETRIC UNIQUE COMBINATION IDENTIFICATION SYSTEM the national security will be enhanced. Terrorists, unauthorised persons, illegal migrants and foreign nationals without visa can be easily detected and tracked.

All such identification efforts share the common goals of speed, reliability, and automation. The use of biometric indicia for identification purposes requires that a particular biometric factor be unique for each individual, that it be readily measured, and that it be invariant over time. As is well known, no two fingerprints are the same, and they do not change except through injury or surgery.

A biometric indicator that has been largely ignored by the art is the iris. The iris of every human eye proves to be essentially immutable over a person's life. No two irises are identical in texture or detail, even in the same person. Although the iris stretches and contracts to adjust the size of the pupil in response to light, its detailed texture remains largely unaltered apart from stretching and shrinking. Such distortions in the texture can readily be reversed mathematically in analyzing an iris image, to extract and encode an iris signature that remains the same over a wide range of pupillary dilations. The registration and identification of the iris can be performed using a video camera without any physical contact, automatically and unobtrusively.

Similarly dental impression is unique for every individual & remains unaltered.

By comparison, other biometrics such as signatures, photographs, fingerprints, voice prints, and retinal blood vessel patterns all have significant drawbacks. Although signatures and photographs are cheap and easy to obtain and store, they are impossible to identify automatically with assurance, and are easily forged. Electronically recorded voice prints are susceptible to changes in a person's voice, and they can be counterfeited. Fingerprints or hand prints require physical contact, and they also can be counterfeited and marred by artifacts.

According to the document WO2011163071 discloses a biometric payment and identification system and method in which purchase of restricted products such as alcohol or tobacco through a vending machine is authorized using biometric characteristics of a user, a biometric payment and identification system includes a vending machine, a biometric reader device communicating with the vending machine, a biometric information database communicating with the biometric reader device and checking software supporting the biometric information database and communicating with the vending machine. The biometric information database is adapted to electronically store biometric information of potential buyers of products contained in the vending machine.

The document CN201751901 describes a large-scale database portrait search comparison system based on a biometric portrait identification technology. The large-scale database portrait search comparison system comprises a portrait comparison server, and is characterized in that the portrait comparison server is respectively connected with a palmtop, a personal computer and a mobile phone via an off-line network, a special network or the Internet, the portrait comparison server is also connected with a database server, and the personal computer is also connected with a portrait collecting equipment. The large-scale database portrait search comparison system of the utility model, which is compatible with different image collecting equipments and supports wired and wireless network transmitting modes, is meanwhile connected with various existing business portrait databases and can be seamlessly connected with a comprehensive population information system, a national fugitive database, a public security organization supervised people database and other various department people databases currently possessed by the public security organization.

According to the invention stated in the patent DE10150979 Payment system, e.g. a cash dispenser has a keyboard or keypad with keys that have scanners for scanning the user's fingerprints. The scanned in fingerprints are then used for biometric identification and authorization. A user uses the keyboard to input bank account number and or sort code.

An innovative device which is used to secure payments or transactions made with a smart card and to validate the identity of the smart card holder using a client/server biometric control operation, regardless of whether said payments or transactions are made directly at a point of sale or from a PC (personal computer or shared open-access computer) which is connected to the Internet or using a mobile telephone, a portable computer (also known as a laptop), a PDA (Personal Device Assistant) or any other mobile or fixed means that can connect to any telecommunication network and carry out a transaction involving the use of biometrics at the transaction generation point. The invention also relates to smart-card-holding employees of financial institutions who perform professional inter-bank transfers. The invention can also be used for the electronic transfer of funds between states, between groups of states, between groups of states and states and between international organizations and states. The invention has been designed in the form of a client/server-type system for authenticating the identity of a smart card holder, based on the use of the smart card and on the identification of the holder by means of biometric data which are stored on an extended memory smart card and compared with biometric data from an external, remote database that is secured and operated by the third-party authentication server or by the financial institution, but which, for reasons of security and performance, are not transferred over the telecommunication network which has been stated in document of patent application WO2006095067.

The document TW571263 states that a mobile payment system and method with security identification of biometric identity, in particular a system and method capable of securely identifying the mobile payment by means of biometric identity. When conducting transaction payment at consumer end (i.e. consumer) based on the system and method of the invention, first transmit personal biometric identity data (voice, fingerprint, voice print, face complexion and image) through data transmission unit to store end or payment receiving end using wire line, wireless, web or senor transmission system for identification of consumer's identity; after identification unit verifies correctly, store further uses wire line, wireless, network transmission system to connect with payment receiving end; after payment receiving end (contacting bank) verifies the ID codes of consumer and store (both parties of transaction) and authentication data to be corrective, forward authorized credit and related information to store; in the end store (store vending merchandise) prints bill, allowing consumer to sign on the bill to complete transaction after consumer checks the bill amount and related information.

The invention stated in CN101398961 discloses an escort system for escorting by a biometric identification technology. The system mainly comprises a background service center and an escort vehicle subsystem, and a POS machine is arranged in each escort vehicle, which lowers the cost and improve the safety. Each bank outlet is provided with one POS machine in the prior art, while only one POS machine is required to be arranged in the escort vehicle by the escort system, thus the machine cost and maintenance cost are reduced. Furthermore, the radio frequency technology is adopted in the escort system to accomplish the management of cashboxes. The background service center performs RFID registration for the cashboxes of all bank outlets in advance to uniformly make and issue electronic tags, and then the tags data are downloaded to the escort vehicle subsystem; at each handover, each cashbox is required to be recorded by the RFID identification when the cashbox enters or leaves the vehicle. The invention further provides an escort method for escorting by the biometric identification technology.

The other document U.S. Pat. No. 5,291,560 describes a system for rapid and automatic identification of persons, with very high reliability and confidence levels. The iris of the eye is used an optical fingerprint, having a highly detailed pattern that is unique for each individual and stable over many years. Image analysis algorithms find the iris in a live video image of a person's face, and encode its texture into a compact signature, or "iris code." Iris texture is extracted from the image at multiple scales of analysis by a self-similar set of quadrature (2-D Gabor) band pass filters defined in a dimensionless polar coordinate system. The sign of the projection of many different parts of the iris onto these multi-scale quadrature filters, determines each bit in an abstract (256-byte) iris code. Because of the universal mathematical format and constant length of the iris codes, comparisons between them are readily implemented by the Exclusive-OR (XOR) logical operation. Pattern recognition is achieved by combining special signal processing methods with statistical decision theory, leading to a statistical test of independence based on a similarity metric (the Hamming distance) that is computed from the XOR of any two iris codes.

The other document U.S. Pat. No. 5,719,950 states a personal, biometric authentication system is disclosed. The system can be used for controlling access to equipment or physical facilities. The system employs the combination of a unique, inherently specific biometric parameter recognized and compared with stored data and at least one non-specific biometric parameter of a physiological characteristic recognized and compared with physiological norms. Positive comparison results in authentication of an individual that is not incapacitated, dismembered, or deceased.

Published PCT patent application WO 90/08366 (Clayden) teaches identification of a person by monitoring one or a number of "biometric" parameters such as bone structure, temperature, fingernail pattern, creases in the palm or fingers of the hand and comparing the monitored data with stored characteristics. Further, teachings include reference to speech, handwriting and piano keyboard "signatures".

The document 522/DEL/2015 describes an apparatus and method having biometric identification intrusion and access control. The apparatus features a monitoring system, visual input device and an audible input device. The visual and audible input devices are coupled to control circuits of the monitoring system which can implement an authentication process responsive to both visual and audile inputs.

The document 1072/MUM/2012 illustrates a system and a method for providing a personalized biometric identification system to facilitate in securing critical transactions has been disclosed. The system 100 includes a server 102 which captures pre-designated biometric prints of a user, personalizes them and registers them on a bio print reader 126, owned by the user, over a unidirectional non-Internet based channel. The system 100 overcomes the challenges involved in employing biometrics as a part of non-repudiation process for authorizing Internet based critical transactions for multiple entities by assuring the safety of the biometric prints of the users and eliminating additional hardware requirements.

None of these above patents, however alone or in combination, disclose the present invention. The invention consists of certain novel features and a combination of parts hereinafter fully described, illustrated in the accompanying drawings, and particularly pointed out in the appended claims, it being understood that various changes in the details may be made without departing from the spirit, or sacrificing any of the advantages of the present invention.

SUMMARY OF THE INVENTION

This invention relates to Banking, National Security and Governance with BIOMETRIC UNIQUE COMBINATION IDENTIFICATION SYSTEM and in particular, this invention relates to Banking, National Security and Governance with BIOMETRIC UNIQUE COMBINATION IDENTIFICATION SYSTEM which will provide paperless, fraud less, ultra secure, convenient, cheap, fast, affordable banking, enhance National Security and provide good governance to all since it will completely eradicate the possibility of having more than one identity. Furthermore, this invention also relates to Banking, National Security and Governance with BIOMETRIC UNIQUE COMBINATION IDENTIFICATION SYSTEM which has the advantages of being simple in structure and convenient to use and install, improving the filling efficiency, reducing manual costs and the like.

DETAILED DESCRIPTION OF THE INVENTION WITH ACCOMPANYING DRAWINGS

For the purpose of facilitating an understanding of the invention, there is illustrated in the accompanying drawings a preferred embodiment thereof, from an inspection of which, when considered in connection with the following description, the invention, its construction and operation, and many of its advantages should be readily understood and appreciated. The drawings are in ten sheets.

The principal object of the invention is to provide Banking, National Security and Governance with BIOMETRIC UNIQUE COMBINATION IDENTIFICATION SYSTEM.

The other embodiment of the invention is to provide Banking, National Security and Governance with BIOMETRIC UNIQUE COMBINATION IDENTIFICATION SYSTEM which will provide paperless, fraud less, ultra secure, convenient, cheap, fast, affordable banking, enhance National Security and provide good governance to all since it will completely eradicate the possibility of having more than one identity.

The other embodiment of the invention is to provide Banking, National Security and Governance with BIOMETRIC UNIQUE COMBINATION IDENTIFICATION SYSTEM which comprises a) an image input means, b) authorization system and c) module, The other embodiment of the invention is to provide Banking, National Security and Governance with BIOMETRIC UNIQUE COMBINATION IDENTIFICATION SYSTEM which has the advantages of being simple in structure and convenient to use and install, improving the filling efficiency, reducing manual costs and the like.

The other embodiment of the invention is to provide Banking, National Security and Governance with BIOMETRIC UNIQUE COMBINATION IDENTIFICATION SYSTEM which measure positively establishes, confirms, or disconfirms the identity of any individual and also generates an objective confidence level associated with any such identification decision.

Still another object of the present invention is to provide the method for Banking, National Security and Governance with BIOMETRIC UNIQUE COMBINATION IDENTIFICATION SYSTEM which comprises;

a) 3D face scan and geometry, retina scan, iris scan, no of eye blinks, ear print, dental impression, palm scan and geometry, fingerprint, vein print, pulse rate, voice print, average IQ mapping by asking different reasoning and aptitude questions during customer enrolment are done;

b) All required data and personal information about the individual is filled in the BIOMETRIC UNIQUE COMBINATION IDENTIFICATION SYSTEM software interface.

c) The scanned data of the customer is encoded as per requirement and stored in the Central Data Base which may be cloud based or physical server based wherein the central data base has two parts encrypted and non encrypted part. Encrypted part stores the confidential data whereas the non encrypted part stores general data.

d) For a corresponding BIOMETRIC UNIQUE COMBINATION IDENTIFICATION SYSTEM ID an account no. is marked.

e) All the conditions, personal security and details of banking will be marked on the BIOMETRIC UNIQUE COMBINATION IDENTIFICATION SYSTEM ID and with the same BIOMETRIC UNIQUE COMBINATION IDENTIFICATION SYSTEM ID the customer can open and operate accounts in various banks.

f) The spread of digital connectivity and mobile phones have created attractive opportunities in financial inclusion.

g) BIOMETRIC UNIQUE COMBINATION IDENTIFICATION SYSTEM ID will have POS and payment gateway support and BIOMETRIC UNIQUE COMBINATION IDENTIFICATION SYSTEM ID will be directly integrated with business intelligence to increase transparency and control of banking business.

Apart from all these BIOMETRIC UNIQUE COMBINATION IDENTIFICATION SYSTEM ID will perform all the functions which a bank normally does.

The other embodiment of the invention is to provide the method for providing Banking, National Security and Governance with BIOMETRIC UNIQUE COMBINATION IDENTIFICATION SYSTEM which has the advantages of simple structure, high production efficiency and the like and time-saving and labor-saving.

The other embodiment of the invention is to provide the method for providing Banking, National Security and Governance with BIOMETRIC UNIQUE COMBINATION IDENTIFICATION SYSTEM which enables to rapidly inquiry detailed information and to identify the identity, with high safety and wide adaptability.

The novel features that are considered characteristic of the present invention are set forth with particularity in the appended claims. The invention itself, however, both as to its organization and its method of operation, together with additional objects and advantages thereof, will best be understood from the following description of certain specific embodiments, when read in connection with the accompanying drawings, in which:

FIG. 3 (*a*) is a perspective view of BIOMETRIC UNIQUE COMBINATION IDENTIFICATION SYSTEM Vending Machine and welcome screen of BIOMETRIC UNIQUE COMBINATION IDENTIFICATION SYSTEM Vending Machine for customer of the present invention.

Figure 3:
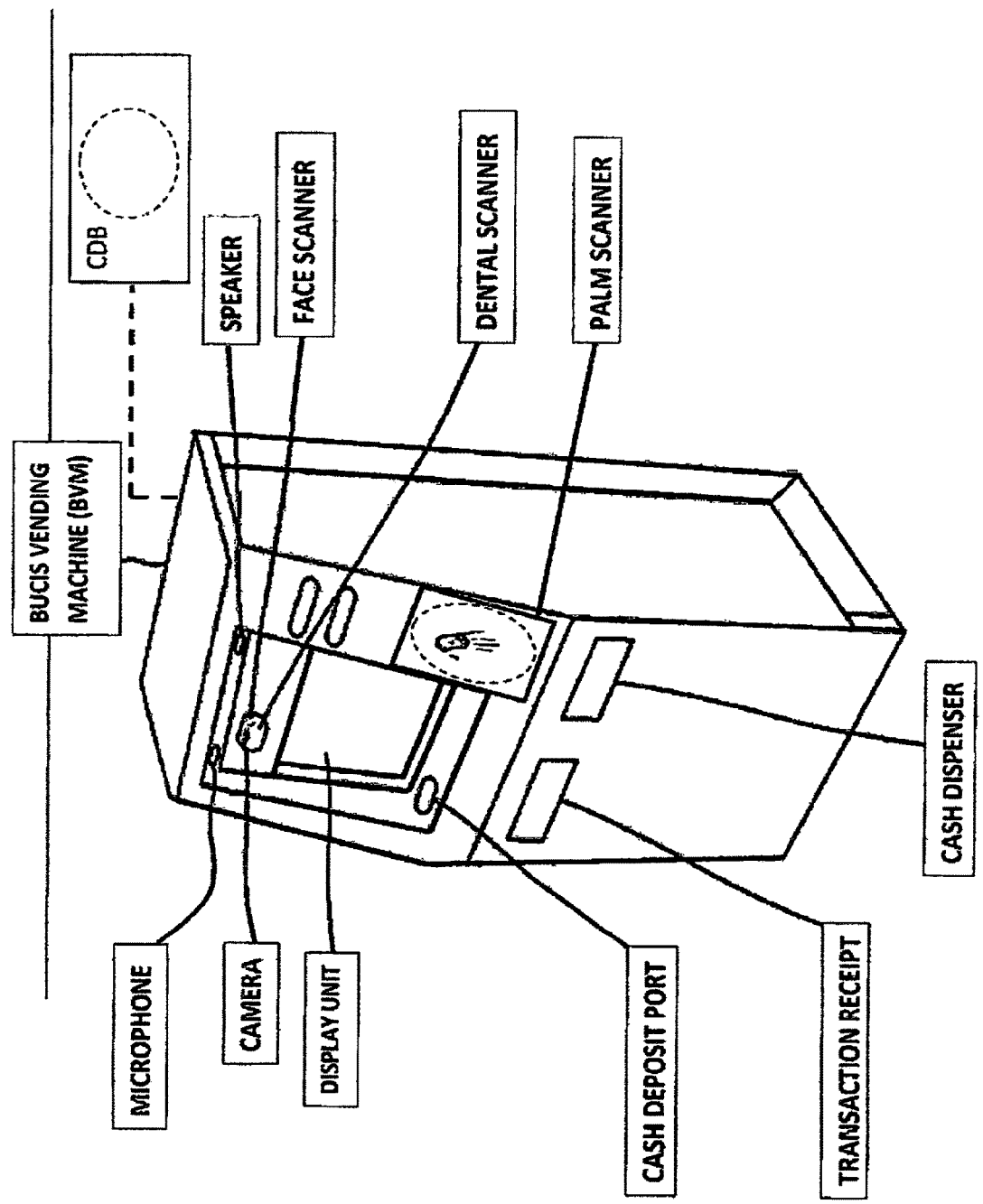
FIG. 3 is a perspective view of BIOMETRIC UNIQUE COMBINATION IDENTIFICATION SYSTEM Vending Machine of the present invention.
Figure 3B:
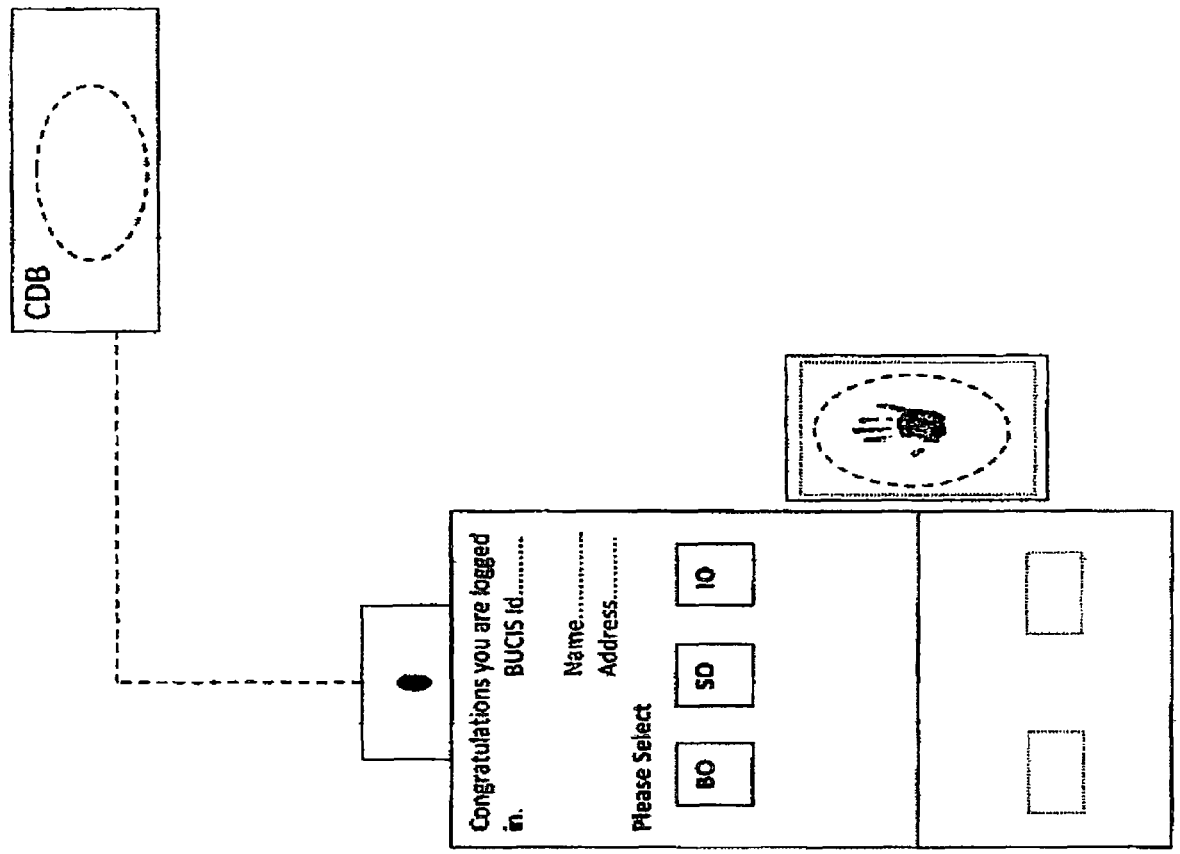
FIG. 3(b) is a perspective view of a BIOMETRIC UNIQUE COMBINATION IDENTIFICATION SYSTEM Vending Machine after the customer has logged in. After log in three applications shows namely Banking Application, National Security application and Universal ID applications & the customer can use accordingly to their need of the present invention.
Figure 3:
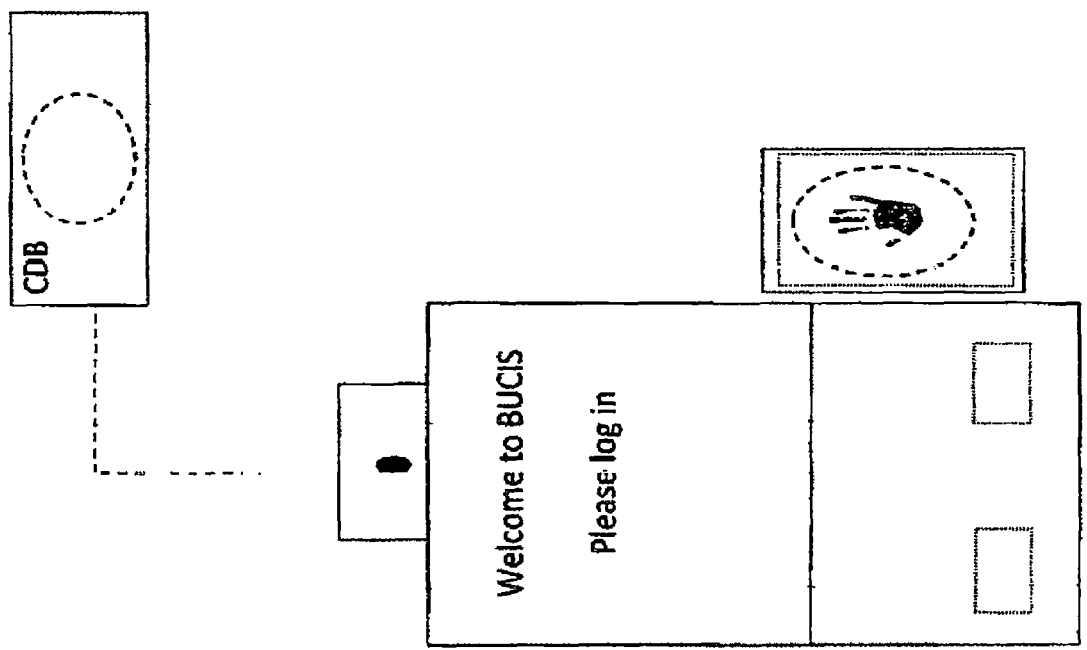
Figure 3D:
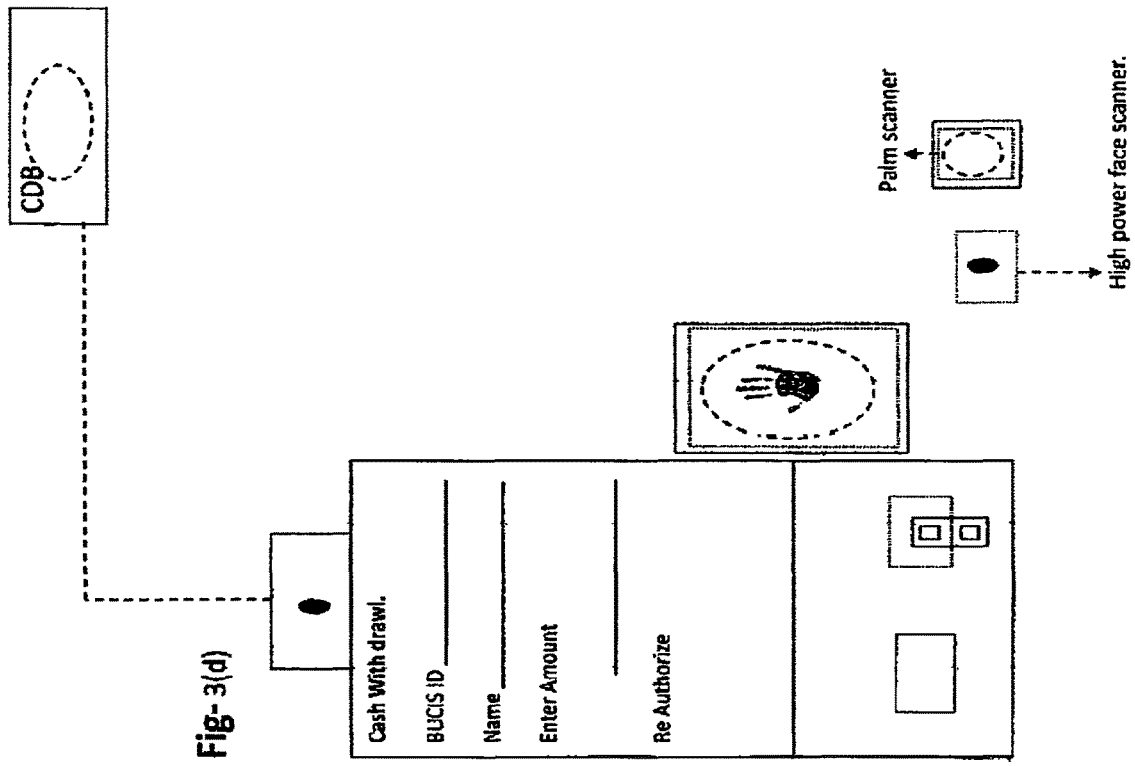
Figure 3C:
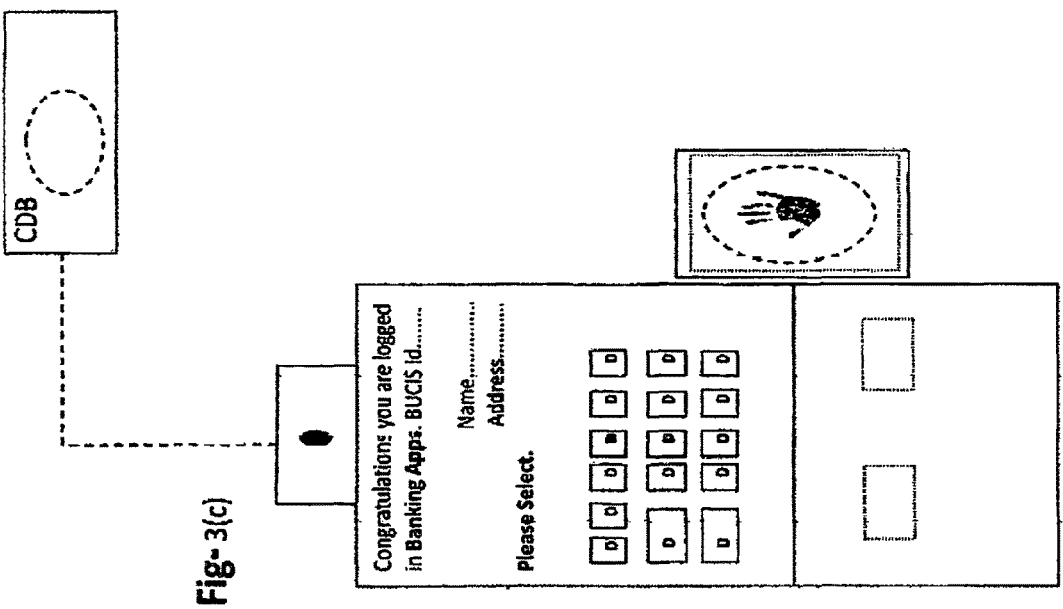

FIG. 3(c) is a perspective view of BIOMETRIC UNIQUE COMBINATION IDENTIFICATION SYSTEM Vending Machine when the customer selects Banking applications. In Banking Application all the accounts of the individual of different banks mapped in the BIOMETRIC UNIQUE COMBINATION IDENTIFICATION SYSTEM ID opens and the customer selects as per their requirement. On selecting a number of banking application opens such as cash deposit, cash with drawl, transfer etc of the present invention.

FIG. 3(d) is a perspective view of BIOMETRIC UNIQUE COMBINATION IDENTIFICATION SYSTEM Vending Machine when the customer selects cash with drawl in FIG. 3(c). When the user clicks on cash withdrawal he/she has to enter amount & re verify themselves for withdrawal of the present invention.

Figure 4:
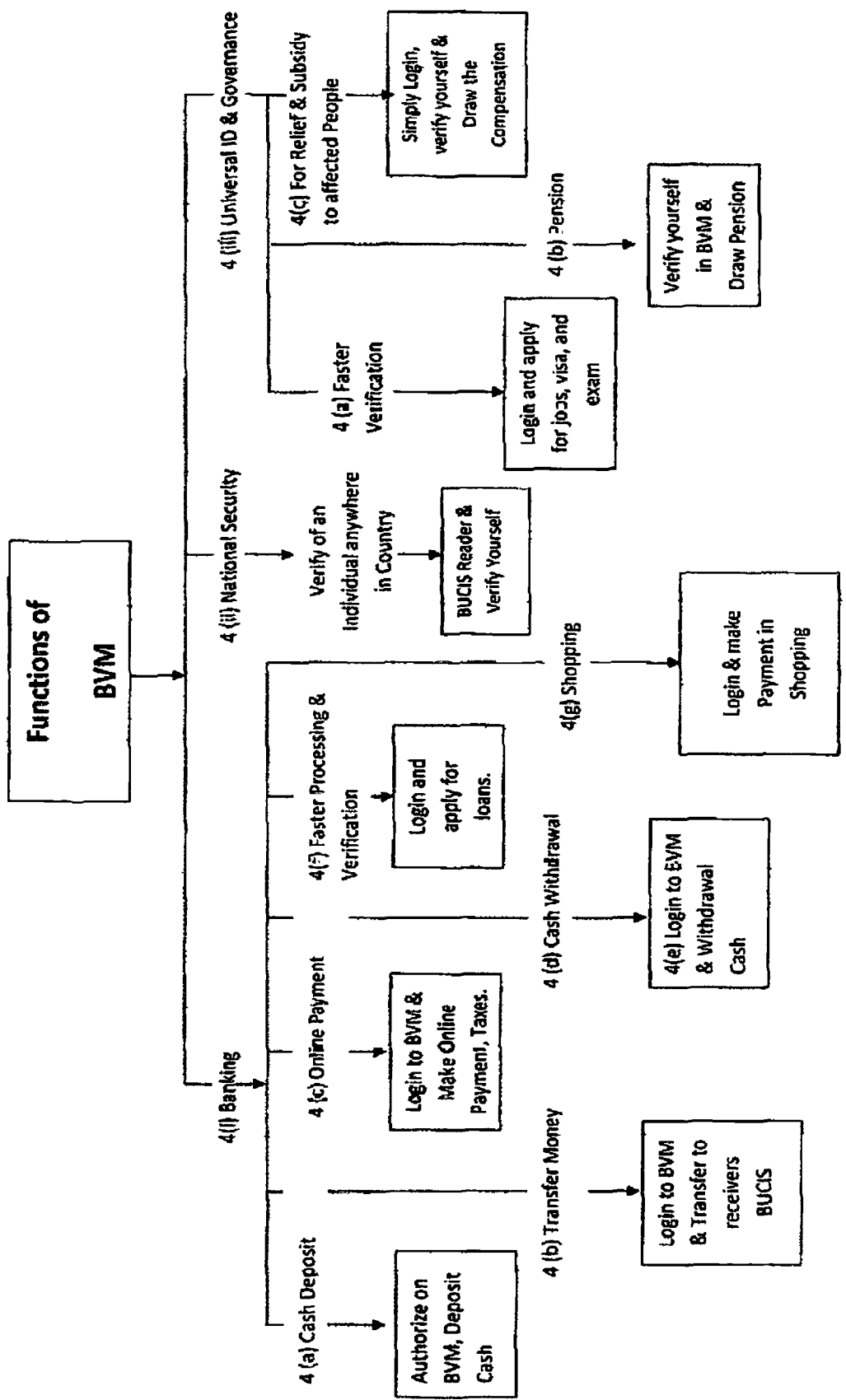

FIG. 4 illustrates a perspective view of all the functions that a BIOMETRIC UNIQUE COMBINATION IDENTIFICATION SYSTEM Vending Machine can perform after a customer logs in. After login to a BIOMETRIC UNIQUE COMBINATION IDENTIFICATION SYSTEM Vending Machine it shows 3 applications namely banking applications, national Security applications and Universal Id applications of the present invention.

FIG. 4 (i) illustrates the banking functions of Biometric personal identification system of the present invention.

FIG. 4 (ii) illustrates the national Security functions of Biometric personal identification system of the present invention.

FIG. 4 (iii) illustrates the Universal ID functions of Biometric personal identification system of the present invention.

Figure 5:
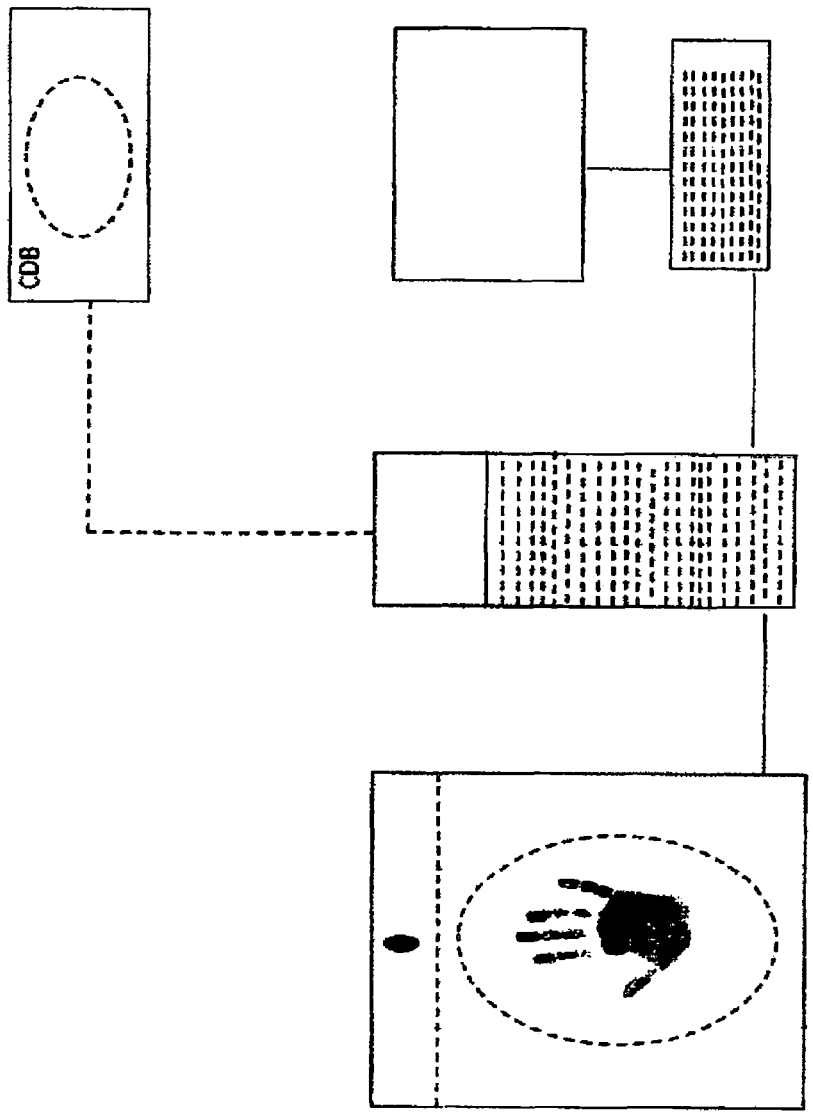

FIG. 5 is a perspective view of a Portable BIOMETRIC UNIQUE COMBINATION IDENTIFICATION SYSTEM Authorizer to be installed at shopping malls or other locations for-shopping & authorization of the present invention.

Figure 6:
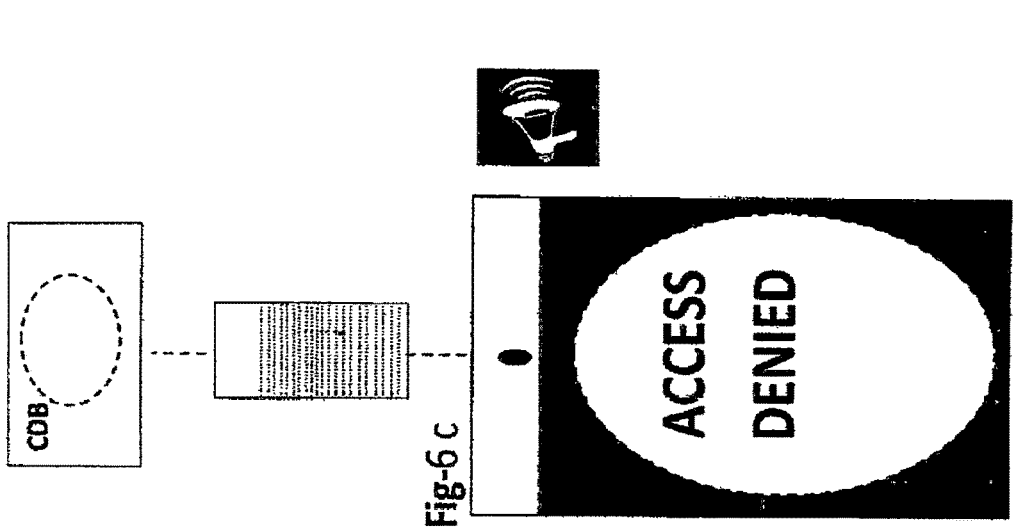
Figure 6:
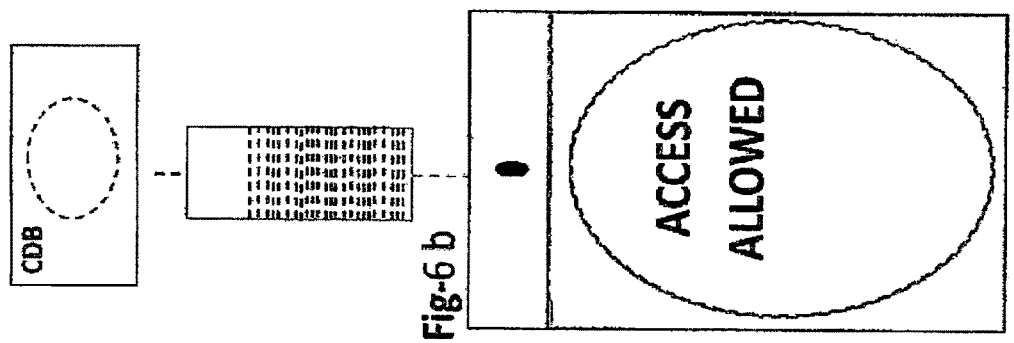
Figure 6:
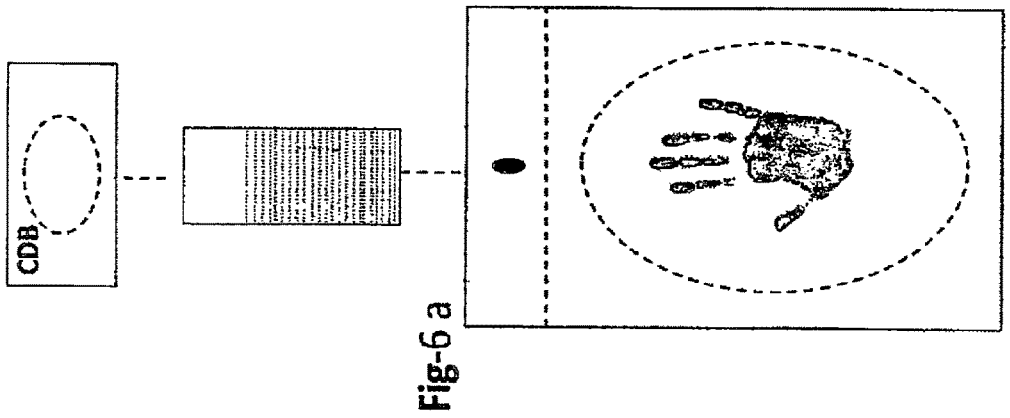

FIG. 6 (a) is a perspective view of the Outdoor BIOMETRIC UNIQUE COMBINATION IDENTIFICATION SYSTEM Authorizer to be installed at all strategically important locations for security verification. When a person authorizes on an Outdoor BIOMETRIC UNIQUE COMBINATION IDENTIFICATION SYSTEM Authorizer of the present invention.

(b) is a perspective view of an Outdoor BIOMETRIC UNIQUE COMBINATION IDENTIFICATION SYSTEM Authorizer, for a genuine person the green light will glow which will allow him to pass of the present invention.

(c) is a perspective view of an Outdoor BIOMETRIC UNIQUE COMBINATION IDENTIFICATION SYSTEM Authorizer when a fake & unauthorized person tries to verify himself red light will glow, siren will ring & alert the security of the present invention.

Figure 7:
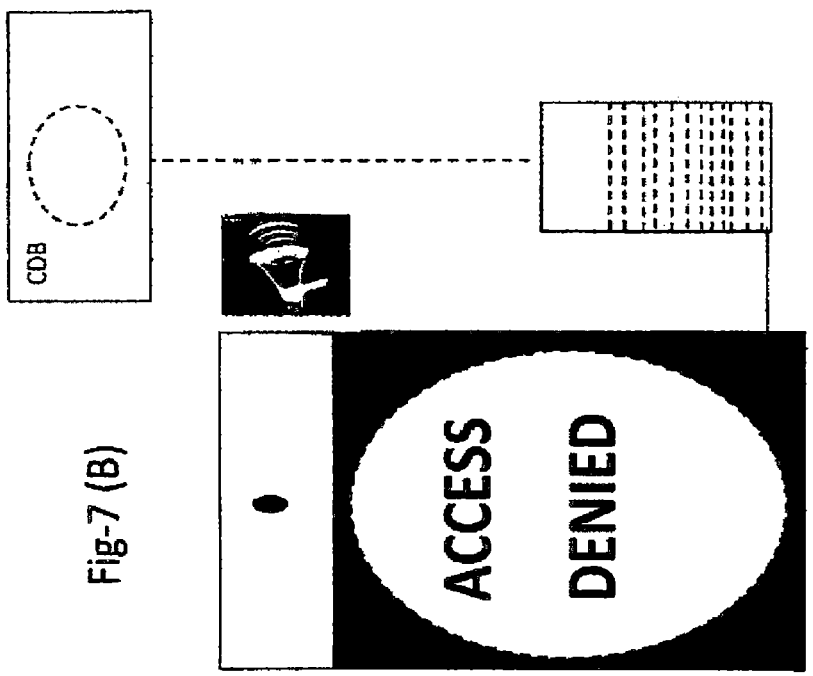
Figure 7:
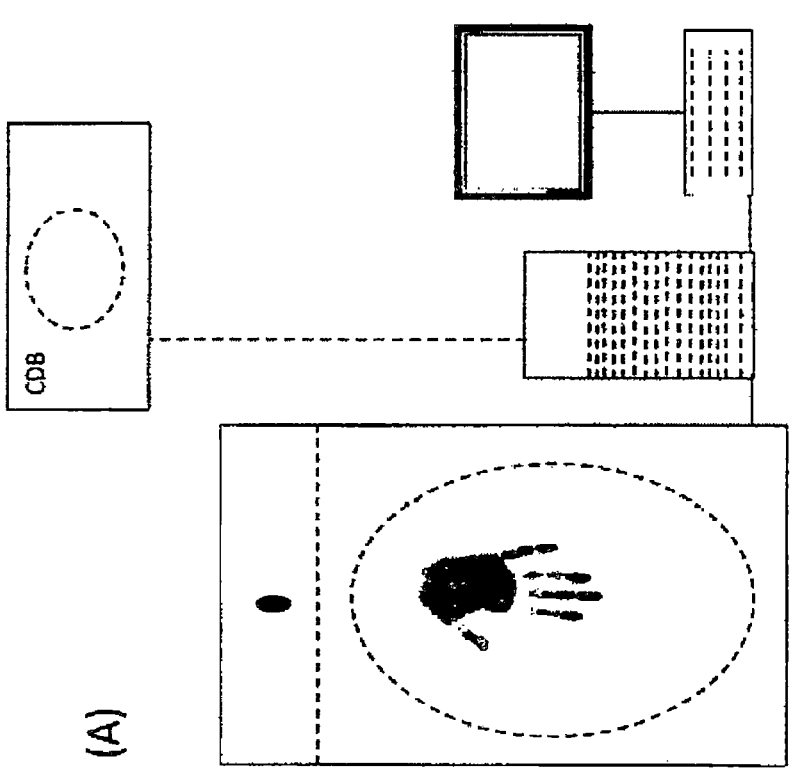

FIG. 7 (a) is a perspective view of Creation of BIOMETRIC UNIQUE COMBINATION IDENTIFICATION SYSTEM ID when a foreign tourist enters our country at entry point. BIOMETRIC UNIQUE COMBINATION IDENTIFICATION SYSTEM ID will be created & time of visit, permits & all details will be set in the BIOMETRIC UNIQUE COMBINATION IDENTIFICATION SYSTEM ID of the present invention.

(b) is a perspective view of an Outdoor BIOMETRIC UNIQUE COMBINATION IDENTIFICATION SYSTEM Authorizer when the permit expires & the tourist overstays in the country after his expiry of permit he cannot do anything as he will be denied access everywhere by Outdoor BIOMETRIC UNIQUE COMBINATION IDENTIFICATION SYSTEM Authorizer of the present invention.

FIG. 8 is the perspective view of Authorization process of an individual's BIOMETRIC UNIQUE COMBINATION IDENTIFICATION SYSTEM ID of the present invention.

All of the customers BIOMETRIC UNIQUE COMBINATION IDENTIFICATION SYSTEM ID will be created which is a combination of 3D face scan and geometry, retina scan, iris scan, no of eye blinks, ear print, dental impression, palm scan & geometry, fingerprint, vein print, pulse rate, voice print and average IQ mapping by asking different reasoning & aptitude questions during enrolment. For each BIOMETRIC UNIQUE COMBINATION-IDENTIFICATION SYSTEM ID a corresponding account number will be marked. Every single aspect and conditions of banking of the customer will be marked to the BIOMETRIC UNIQUE COMBINATION IDENTIFICATION SYSTEM ID. With the help of BIOMETRIC UNIQUE COMBINATION IDENTIFICATION SYSTEM ID the customer will perform all banking needs in a paperless & card less manner & the individual can open and operate various bank accounts. The banks will also benefit immensely since they will save millions from paperwork, manpower and other thing. For online purchase the customer will make payment by authenticating him/herself on BIOMETRIC UNIQUE COMBINATION IDENTIFICATION SYSTEM. Each and every new PC's will have BIOMETRIC UNIQUE COMBINATION IDENTIFICATION SYSTEM ID authenticator/log in system. Improve resistance to fraud and abuse by assuring that users are genuine, and entitled to the services they are claiming. In case of ATM's they will be replaced by BIOMETRIC UNIQUE COMBINATION IDENTIFICATION SYSTEM VENDING MACHINES & the customers will simply authenticate themselves and do functions like Banking, National Security and Universal ID. Card swiping machines will be replaced by Portable BIOMETRIC UNIQUE COMBINATION IDENTIFICATION SYSTEM AUTHORIZER. In case of making payment anywhere by Portable BIOMETRIC UNIQUE COMBINATION IDENTIFICATION SYSTEM AUTHORIZER simply authorize yourself and make payment. Whenever a customer authenticates in to their Biometric unique combination identification system three types of application (banking, security, ID) opens and the customer will use according to their needs. The fear of loss of cards, passwords, cheques is gone.

Promote inclusion by helping customers in emerging economies where people often lack the necessary identity documentation and/or access to bank branches to conveniently assert their own identities (through fingerprint recognition, for example) and/or take advantage of new channels such as branchless banking and mobile payment solutions. BIOMETRIC UNIQUE COMBINATION IDENTIFICATION SYSTEM ID will have better mobile integration which is the latest focus area for all banks. It will give 100% banking coverage to all where the banking system has not reached presently. It will help the pensioner immensely as they don't need to prove themselves which takes a lot of time and simply verify themselves on BIOMETRIC UNIQUE COMBINATION IDENTIFICATION SYSTEM and draw pension. For poor people it will be a boon as there will be no leakage in the distribution of subsidy or relief meant for them. The subsidy and relief will reach the target individuals. Government can effectively monitor who all have received subsidy & relief and who are remaining to receive. It is observed that with increase in age handwriting changes which cause signature mismatch and the fraudsters take advantage of it. The solution is to re-enroll complete feature set after certain time & have proposed an adaptive feature set updating algorithm for multimodal biometrics which will take care of this thing and the update procedure will be secure and gradual over the time. BIOMETRIC UNIQUE COMBINATION IDENTIFICATION SYSTEM will prevent this. BIOMETRIC UNIQUE COMBINATION IDENTIFICATION SYSTEM will be a single window application for all the banking needs of a customer and customer need not run to bank for each work. BIOMETRIC UNIQUE COMBINATION IDENTIFICATION SYSTEM ID will help in faster processing of loans, verification of individuals thereby saving huge costs for bank. It will save time and customers can get loans easily and on time. BIOMETRIC UNIQUE COMBINATION IDENTIFICATION SYSTEM will help banks to keep a better watch on the funds borrowed by the customers. By using BIOMETRIC UNIQUE COMBINATION IDENTIFICATION SYSTEM NPA's can be prevented. The bank can easily get information where a borrower is spending money and whether it is required or just a waste. If a willful defaulter of one bank applies for a loan from another bank they can easily be detected. Decrease burden on the manpower of banks.

By using BIOMETRIC UNIQUE COMBINATION IDENTIFICATION SYSTEM there will be no fake, benami transaction since without BIOMETRIC UNIQUE COMBINATION IDENTIFICATION SYSTEM no payments can be made. BIOMETRIC UNIQUE COMBINATION IDENTIFICATION SYSTEM will stop generation of black money and its movement to abroad. Generation of black money hurts economic growth of a country. By using BIOMETRIC UNIQUE COMBINATION IDENTIFICATION SYSTEM the govt. can keep better watch on business and it will help in better collection of taxes. Leakage in taxes can easily be plugged. By using BIOMETRIC UNIQUE COMBINATION IDENTIFICATION SYSTEM the government can achieve 100% financial inclusion of all people since it is easy to use. Because of its easy to use interface everyone from small road side vendors, small businessman, households to large corporates will use it there by limiting the use of physical currency. Money related robbery and risks will decrease. Income tax department by using BIOMETRIC UNIQUE COMBINATION IDENTIFICATION SYSTEM can collect taxes more efficiently and can keep track of defaulters and people who don't pay taxes. Banks and financial institutions play a major role in the economic development of a country and the success of banks and financial institutes are largely dependent on customer trust and loyalty. Identity theft and fraudulent activities in banking transactions are hampering this industry's growth. So BIOMETRIC UNIQUE COMBINATION IDENTIFICATION SYSTEM will help in all round growth and development of a country.

BIOMETRIC UNIQUE COMBINATION IDENTIFICATION SYSTEM will help in increasing the security of a country since BIOMETRIC UNIQUE COMBINATION IDENTIFICATION SYSTEM will completely eradicate the possibility of having more than one identity. Outdoor BIOMETRIC UNIQUE COMBINATION IDENTIFICATION SYSTEM Authorizers will be installed at the entry points, crowded place, bus stops, railway station, borders, check gates & all strategically important locations. All persons needing to travel through these needs to authorize themselves on Outdoor BIOMETRIC UNIQUE COMBINATION IDENTIFICATION SYSTEM Authorizers readers. Genuine persons will pass through where as for unauthorized persons the red light will glow and siren will ring & the security persons can easily track them. So a security situation can be easily avoided. Our citizen will be more safe & secure.

BIOMETRIC UNIQUE COMBINATION IDENTIFICATION SYSTEM will also be treated as National Identity card which can be used for various purposes both government & non-Government. Provision of multiple services to a large population by govt. and private organisation is a mammoth task and is accompanied by many hurdles. BIOMETRIC UNIQUE COMBINATION IDENTIFICATION SYSTEM will help in better delivery of govt. services like PDS, GRY, self employment, healthcare facilities, insurance and different schemes offered by govt. Help in easy online application for jobs, visa, exams and all other things. No need to fill forms as all data about the person will be stored in it. Simply log into BIOMETRIC UNIQUE COMBINATION IDENTIFICATION SYSTEM & apply. Freedom from attestation of documents. It will help poor people & people from far flung areas who come to nearest towns for attestation or other things. It will also do away with middle man & brokers. If every country adopts BIOMETRIC UNIQUE COMBINATION IDENTIFICATION SYSTEM it will make life easier & the world a better, safe & secure place to live.

Figure 1:
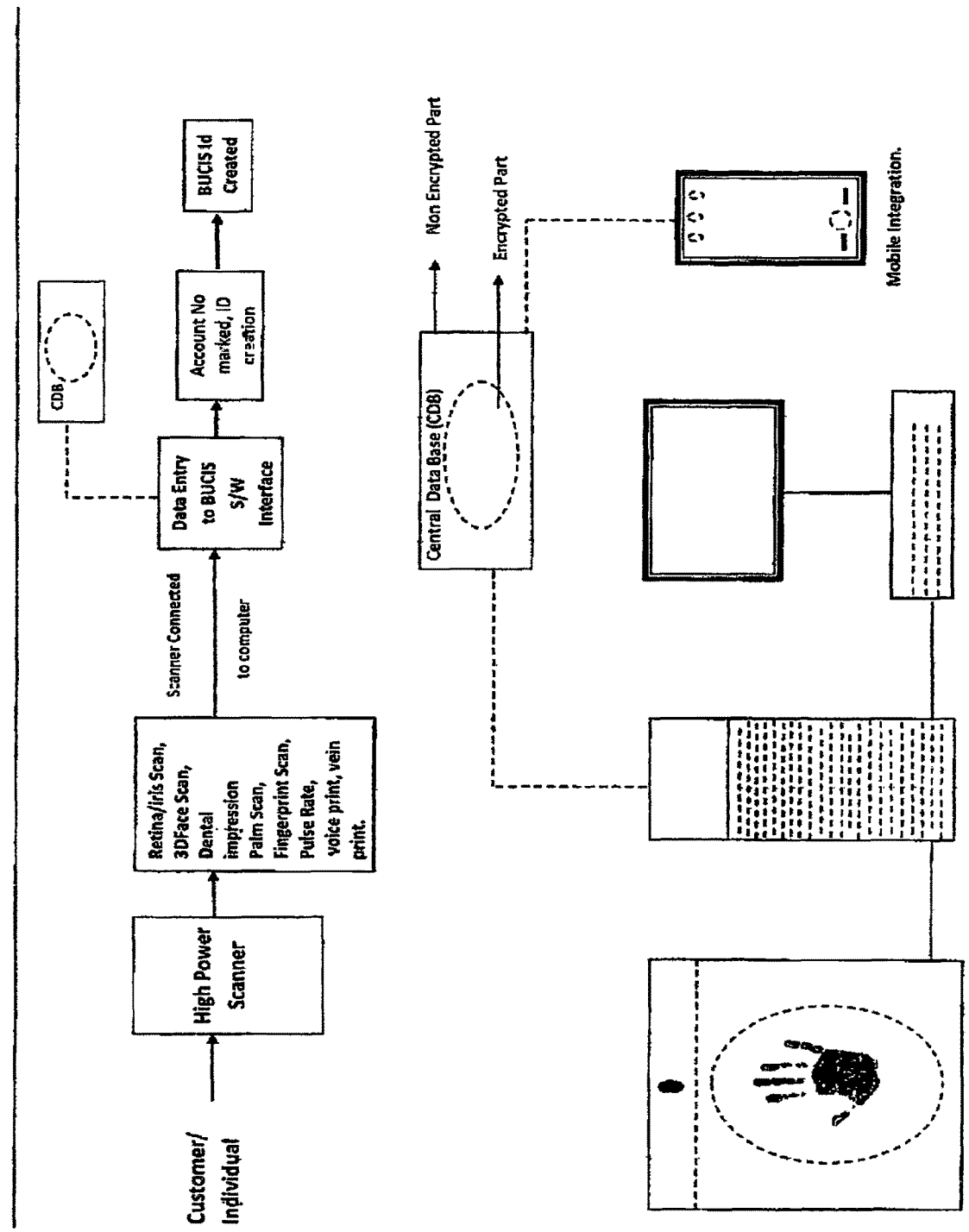
FIG. 1 is a perspective view of how a BIOMETRIC UNIQUE COMBINATION IDENTIFICATION SYSTEM ID is created for an individual of the present invention.

FIG. 1 illustrates a perspective view of how a BIOMETRIC UNIQUE COMBINATION IDENTIFICATION SYSTEM ID is created for a customer. For creation of BIOMETRIC UNIQUE COMBINATION IDENTIFICATION SYSTEM ID the customer goes through a number of processes. The processes includes 3D face scan & geometry, retina scan, iris scan, no of eye blinks, dental impression, palm scan & geometry, fingerprint, vein print, pulse rate, voice print, average IQ mapping by asking different reasoning & aptitude questions during customer enrolment. All required data & personal information about the individual is filled in the BIOMETRIC UNIQUE COMBINATION IDENTIFICATION SYSTEM software inter face. The scanned data of the customer is encoded as per requirement & stored in the Central Data Base (CDB) which may be cloud based or physical server based. The central data base has two parts encrypted and non encrypted part. Encrypted part stores the confidential data whereas the non encrypted part stores general data. Then following the step by step instruction the BIOMETRIC UNIQUE COMBINATION IDENTIFICATION SYSTEM ID is created which is unique & different for different people. For a corresponding BIOMETRIC UNIQUE COMBINATION IDENTIFICATION SYSTEM ID an account no. is marked. All the conditions, personal security and details of banking is marked on the BIOMETRIC UNIQUE COMBINATION IDENTIFICATION SYSTEM ID. With the same BIOMETRIC UNIQUE COMBINATION IDENTIFICATION SYSTEM ID the customer can open & operate accounts in various banks. The spread of digital connectivity and mobile phones have created attractive opportunities in financial inclusion. In particular, BIOMETRIC UNIQUE COMBINATION IDENTIFICATION SYSTEM ID promises to enable hundreds of millions of people to access financial services for the first time due to its wide reach, convenience and low cost of delivery. BIOMETRIC UNIQUE COMBINATION IDENTIFICATION SYSTEM ID will have better mobile integration which is the latest focus area for all banks. Promote inclusion by helping customers in emerging economies where people often lack the necessary identity documentation and or access to bank branches to conveniently assert their own identities and or take advantage of new channels such as branchless banking and mobile payment solutions. 97% of payment transactions for public sector banks are cash paper based as compared to 60% for private sector banks. BIOMETRIC UNIQUE COMBINATION IDENTIFICATION SYSTEM ID will have POS and payment gateway support. BIOMETRIC UNIQUE COMBINATION IDENTIFICATION SYSTEM ID will be directly integrated with business intelligence to increase transparency and control of banking business.

Figure 2:
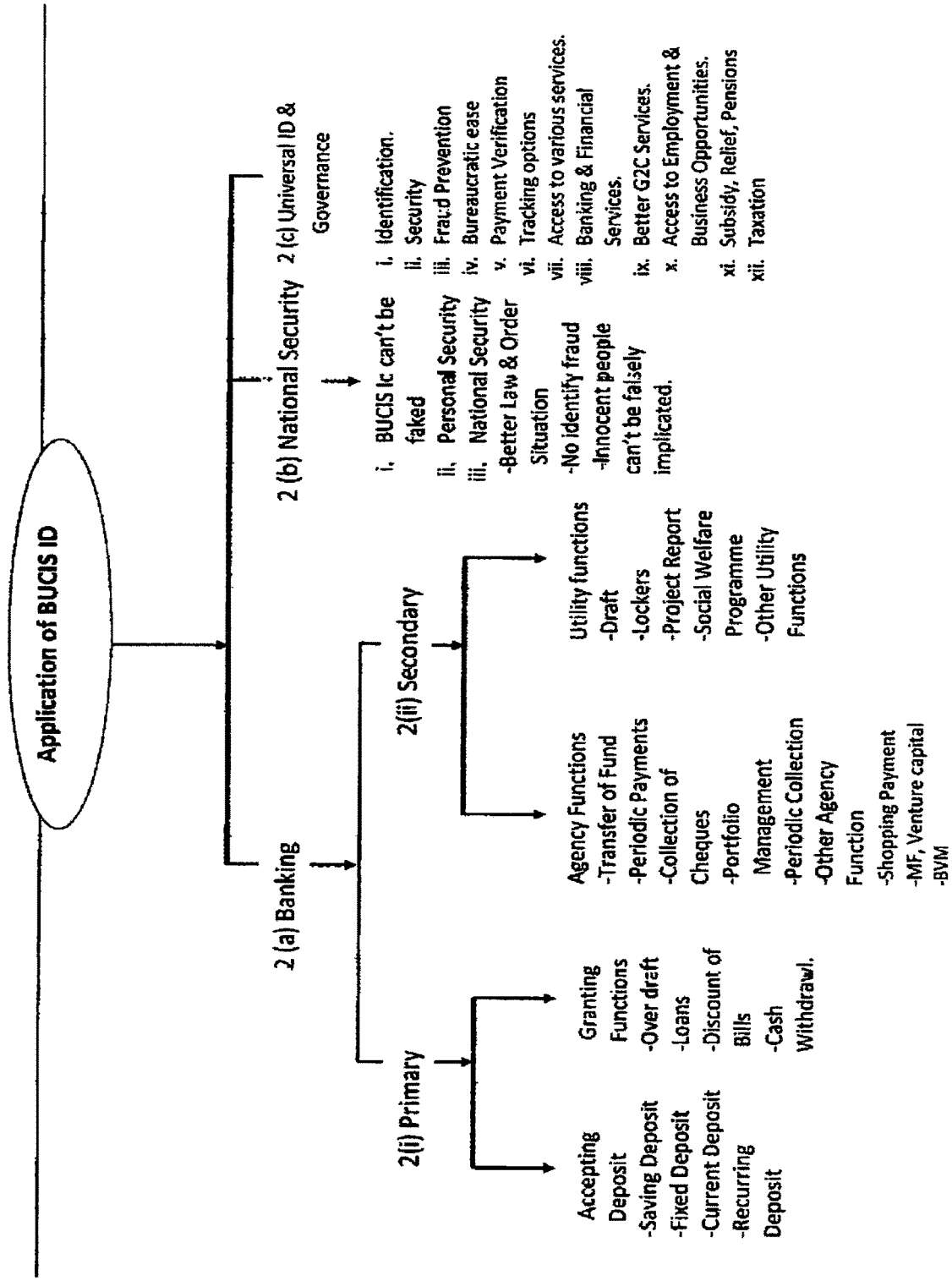
FIG. 2 is a perspective view of the application of BIOMETRIC UNIQUE COMBINATION IDENTIFICATION SYSTEM ID that is Banking, National Security and Governance of the present invention.

FIG. 2 illustrates the perspective view of application of BIOMETRIC UNIQUE COMBINATION IDENTIFICATION SYSTEM ID which will perform services like Banking, National Security and provide Good Governance.

FIG. 2 (a) illustrates the Banking functions of BIOMETRIC UNIQUE COMBINATION IDENTIFICATION SYSTEM ID. It is of two types primary and secondary.

FIG. 2 (a) (i) illustrates the primary functions of Banking that is accepting deposits & granting advances.

FIG. 2(a) (i) * illustrates the accepting deposits functions of a bank that is cash deposit, savings deposit, fixed deposit, current deposit and recurring deposit. When a customer after creation of BIOMETRIC UNIQUE COMBINATION IDENTIFICATION SYSTEM ID visit branches they can be authenticated conveniently at the counter through scanners that match the customer's existing biometric template within the bank database. After successful authentication, the customer will be allowed to move forward with their banking transactions. This will help to maintain a concrete audit trail of every transaction and can prevent fraudulent activity.

FIG. 2 (a) (i) ** illustrates the granting advances functions of the bank. After creation of BIOMETRIC UNIQUE COMBINATION IDENTIFICATION SYSTEM Account all the conditions of banking are marked on the BIOMETRIC UNIQUE COMBINATION IDENTIFICATION SYSTEM ID. The mortgage details, collateral security, personal security details, hypothecation details, personal guarantee are all marked in the ID. After that the banks make disbursement depending on the amount of mortgage value. Different types of loan like short term, medium term, call, overdraft, cash credit are given after security verification and mapping on BIOMETRIC UNIQUE COMBINATION IDENTIFICATION SYSTEM ID.

FIG. 2 (a) (ii) illustrates the Secondary functions of a Bank that is Agency functions and utility functions.

FIG. 2 (a) (ii) * illustrates the agency functions of a bank. The bank acts as an agent of its customers. The bank performs a number of agency functions. The customer will log in to his BIOMETRIC UNIQUE COMBINATION IDENTIFICATION SYSTEM ID anywhere and transfer funds easily. Banks pay insurance premium of their customers, deposit loan installments, income-tax, interest, send money from one place to another, purchase and sell securities, mutual funds, venture capital, shares and debentures on behalf of their customers with the help of customers BIOMETRIC UNIQUE COMBINATION IDENTIFICATION SYSTEM ID. While taking a loan the premium etc are mapped to the BIOMETRIC UNIQUE COMBINATION IDENTIFICATION SYSTEM ID. BIOMETRIC UNIQUE COMBINATION IDENTIFICATION SYSTEM Vending Machines services will be provided by the bank.

FIG. 2 (a) (ii) ** illustrates the Utility functions of the bank. The banks while marking on the BIOMETRIC UNIQUE COMBINATION IDENTIFICATION SYSTEM ID performs functions such as Issue of Drafts, Letter of Credits, Locker Facility, Underwriting of Shares, Dealing in Foreign Exchange, Project Reports, Social Welfare Programs. Banks acts as a referee to financial standing of customers. It collects creditworthiness information about clients of its customers. It provides market information to its customers, etc. It provides travelers' cheque facility to customers using their BIOMETRIC UNIQUE COMBINATION IDENTIFICATION SYSTEM ID. Each and every services offered to the customer will be mapped to the customers BIOMETRIC UNIQUE COMBINATION IDENTIFICATION SYSTEM ID.

FIG. 2 (b) illustrates the security application of BIOMETRIC UNIQUE COMBINATION IDENTIFICATION SYSTEM ID.

FIG. 2(b) (i) illustrates BIOMETRIC UNIQUE COMBINATION IDENTIFICATION SYSTEM ID can't be faked whereas an individual can be faked. BIOMETRIC UNIQUE COMBINATION IDENTIFICATION SYSTEM ID will completely eradicate the possibility of having more than one identity. So there will be better law and order situation in the country.

FIG. 2(b) (ii) illustrates the personal security features of BIOMETRIC UNIQUE COMBINATION IDENTIFICATION SYSTEM ID. Since BIOMETRIC UNIQUE COMBINATION IDENTIFICATION SYSTEM will completely eradicate the possibility of having more than one identity there will be no identity theft. Innocent, ignorant people can't be falsely implicated. So it increases personal security.

FIG. 2(b) (iii) illustrates the National Security features. Since there will be no duplicate identity it will help in combating crime and potential attacks by terrorists. Outdoor BIOMETRIC UNIQUE COMBINATION IDENTIFICATION SYSTEM Authorizers will be installed at all strategically important locations throughout the country. All individuals who will pass through these areas will be required to authorize themselves on Outdoor BIOMETRIC UNIQUE COMBINATION IDENTIFICATION SYSTEM Authorizers. So unauthorized persons, terrorists, illegal migrants etc can be easily tracked and detained which will avoid major security risks.

FIG. 2 (c) illustrates the Universal ID features which will help the individual as well as the government in providing good governance.

FIG. 2 (c) (i) illustrates the use of BIOMETRIC UNIQUE COMBINATION IDENTIFICATION SYSTEM ID as Universal ID card. The primary function of the ID card is for identification of the individual apart from banking. The typical information on the BIOMETRIC UNIQUE COMBINATION IDENTIFICATION SYSTEM ID is the person's name, age, sex, photograph, 3D face scan & geometry, retina scan, iris scan, no of eye blinks, dental impression, palm scan & geometry, fingerprint, vein print, pulse rate, voice print and average IQ, permanent address, physical attributes, occupation, ethnicity and religion, etc.

FIG. 2 (c) (ii) illustrates the security features of BIOMETRIC UNIQUE COMBINATION IDENTIFICATION SYSTEM ID. Security is a major reason for the implementation of a single Universal ID. In many workplaces, such as banks, large office buildings, stadiums and especially government or military premises, ID cards are essential to making sure that only authorized persons have access to the premises. Often there are levels of ID cards that grant different access authorization to different individuals, thereby safeguarding sensitive areas from persons unauthorized to enter. So BIOMETRIC UNIQUE COMBINATION IDENTIFICATION SYSTEM will solve these by implementing all into one BIOMETRIC UNIQUE COMBINATION IDENTIFICATION SYSTEM ID. While entering the individual has to authorize in the Outdoor BIOMETRIC UNIQUE COMBINATION IDENTIFICATION SYSTEM Authorizer to enter.

FIG. 2 (c) (iii) illustrates fraud prevention by using BIOMETRIC UNIQUE COMBINATION IDENTIFICATION SYSTEM ID. Prevention of fraud, especially through collecting multiple government benefits, is one of the main purposes of ID card. A BIOMETRIC UNIQUE COMBINATION IDENTIFICATION SYSTEM ID card enables government agencies to better regulate the people on their books and in databases, and fraud becomes more difficult. So a single universal BIOMETRIC UNIQUE COMBINATION IDENTIFICATION SYSTEM ID will help the govt.

FIG. 2(c) (iv) illustrates the bureaucratic ease of BIOMETRIC UNIQUE COMBINATION IDENTIFICATION SYSTEM ID which will make these processes much more streamlined, especially when an ID card is issued as a multi-purpose ID card. The BIOMETRIC UNIQUE COMBINATION IDENTIFICATION SYSTEM ID will include health care, driver's license, passport information and all details of the individual.

FIG. 2 (c) (v) illustrates payment verification will be done by BIOMETRIC UNIQUE COMBINATION-IDENTIFICATION SYSTEM ID. When a customer wants to pay for merchandise or services, he can do so with cash, which requires no advance knowledge for acceptance. However, he is just as likely to pay with a credit card or check, which can be produced by many financial institutions unknown to you. It can cause lot of problems. This can be solved by using BIOMETRIC UNIQUE COMBINATION IDENTIFICATION SYSTEM ID which is very simple and easy. The customer will simply log into BIOMETRIC UNIQUE COMBINATION IDENTIFICATION SYSTEM and transfer funds.

FIG. 2 (c) (vi) illustrates the tracking options of BIOMETRIC UNIQUE COMBINATION IDENTIFICATION SYSTEM ID. An Universal ID card can improve your customer response and services if it is used to organize and access customer information. For example, if you run a medical business, the customer database can contain insurance information, medications, health background, medical conditions and current treatments. When your client comes in for a consultation, you can use his ID to access the database and quickly answer questions about his past history, how much he has to pay out of pocket and what therapy he must undergo. By using BIOMETRIC UNIQUE COMBINATION IDENTIFICATION SYSTEM personalized banking services will be provided.

FIG. 2 (c) (vii) illustrates the access to various services by using BIOMETRIC UNIQUE COMBINATION IDENTIFICATION SYSTEM ID. There are innumerable services accessed and used by citizens each day. To access these services, it would be required to produce identification proof, residence proof and citizenship proof in order to overcome fraud or any discrepancies. A BIOMETRIC UNIQUE COMBINATION IDENTIFICATION SYSTEM ID will play a vital role being a single comprehensive ID proof, which could serve multiple purposes.

FIG. 2(c) (viii) illustrates the use of BIOMETRIC UNIQUE COMBINATION IDENTIFICATION SYSTEM ID to access Financial & Banking Services. The individual would be interested to access financial & banking services either for investment or to take educational loans for higher studies or for an entrepreneurial venture.

FIG. 2(c) (ix) illustrates the use of BIOMETRIC UNIQUE COMBINATION IDENTIFICATION SYSTEM ID in Government to Citizen Services. There are number of G2C services being provided for the betterment of citizens and the nation as a whole e.g. driving license, passport, and voter's ID card, employment in government organization, Employees Provident Fund, etc.

FIG. 2(c) (x) illustrates the use of BIOMETRIC UNIQUE COMBINATION IDENTIFICATION SYSTEM ID in Access to Employment & Business Opportunities. A BIOMETRIC UNIQUE COMBINATION IDENTIFICATION SYSTEM ID helps citizens to access employment opportunities in government and private entities. A BIOMETRIC UNIQUE COMBINATION IDENTIFICATION SYSTEM ID gives authenticity and acts as identification and proof of residence.

FIG. 2 (c) (xi) illustrates the use of BIOMETRIC UNIQUE COMBINATION IDENTIFICATION SYSTEM ID in receiving Old Age Service. A Universal BIOMETRIC UNIQUE COMBINATION IDENTIFICATION SYSTEM ID will enable the country's senior citizens in easily accessing services required by them like pension fund, banking and postal services, health & medical services, concession in transportation charges, tax exemption facilities, etc.

FIG. 2 (c) (xii) illustrates the use of BIOMETRIC UNIQUE COMBINATION IDENTIFICATION SYSTEM ID in Taxation. Since each individual have a unique BIOMETRIC UNIQUE COMBINATION IDENTIFICATION SYSTEM ID it will help in better collection of Taxes.

FIG. 3 illustrates a typical BIOMETRIC UNIQUE COMBINATION IDENTIFICATION SYSTEM Vending Machine showing all the components & is connected to the Central Data Base through, internet and performs a number of functions. A self check system software is added to the BIOMETRIC UNIQUE COMBINATION IDENTIFICATION SYSTEM Vending Machine to monitor its working. Braille support is also present in the BIOMETRIC UNIQUE COMBINATION IDENTIFICATION SYSTEM Vending Machine to help the blind. The identity of the individuals using BIOMETRIC UNIQUE COMBINATION IDENTIFICATION SYSTEM Vending Machine will be hidden unless & until security requests are made to disclose.

FIG. 3 (a) illustrates a BIOMETRIC UNIQUE COMBINATION IDENTIFICATION SYSTEM Vending Machine KIOSK. A customer wanting to do transaction enters the KIOSK. On touching the machine he will be greeted with a welcome screen where the customer will be asked to login their credentials. 3D face scan & geometry, retina scan, iris scan, no of eye blinks, dental impression, palm scan & geometry, fingerprint, vein print, pulse rate, voice print and average IQ mapping will be done. The collected biometrics will be encoded and sent to central data base where it will be decoded and matched with the stored data. If match occurs it allows authorization or else authorization fails. For three failed authorization the BIOMETRIC UNIQUE COMBINATION IDENTIFICATION SYSTEM Vending Machine locks & a voice guiding support is also present to guide customers.

FIG. 3 (b) illustrates after authorization of the customer, home screen will appear which opens three applications namely Banking Application, National Security application and Universal ID applications & the customer can use accordingly to their need. For example if the customer selects banking applications.

FIG. 3 (c) illustrates the perspective view of the BIOMETRIC UNIQUE COMBINATION IDENTIFICATION SYSTEM Vending Machine after customer selects banking applications. All the accounts of the customer from different banks mapped to the BIOMETRIC UNIQUE COMBINATION IDENTIFICATION SYSTEM ID opens and the customer will select the preferred bank for doing the transaction. After selection of the required bank, this will lead to a host of applications like, Cash Deposit, Transfer, online payment, cash withdrawal, loans, etc. For example if the customer selects cash with drawl.

FIG. 3(d) illustrates the perspective view of the BIOMETRIC UNIQUE COMBINATION IDENTIFICATION SYSTEM Vending Machine after the customer selects cash with drawl. The customer has to enter amount & re authorize for withdrawal. All the authorization steps in the FIG. 3 (a) to be followed again. After reauthorization the dispenser gives cash.

FIG. 4 illustrates a perspective view of all the functions that a BIOMETRIC UNIQUE COMBINATION, IDENTIFICATION SYSTEM Vending Machine can perform after a customer logs in. After authorization it shows 3 applications namely banking applications, national Security applications and Universal Id applications. The identity of the individuals using BIOMETRIC UNIQUE COMBINATION IDENTIFICATION SYSTEM Vending Machine will be hidden unless & until security requests are made to disclose.

FIG. 4 (i) illustrates the banking functions of BIOMETRIC UNIQUE COMBINATION IDENTIFICATION SYSTE Vending Machine,
- a). For cash deposit at the banks counter & BIOMETRIC UNIQUE COMBINATION IDENTIFICATION SYSTEM Vending Machine the customer will simply authorize to his BIOMETRIC UNIQUE COMBINATION IDENTIFICATION SYSTEM ID & deposit cash & it will be credited to his account.
- b) In case of transfer of money the customer will log in to his BIOMETRIC UNIQUE COMBINATION IDENTIFICATION SYSTEM ID & transfer money to the receiver's BIOMETRIC UNIQUE COMBINATION IDENTIFICATION SYSTEM IO. No need of cards, cheques, signature etc. No fear of losing them also. The transfer is fast, easy, secure, cheap & requires real time biometric authorization.
- c) In case of online payment the customer will log into his BIOMETRIC UNIQUE COMBINATION IDENTIFICATION SYSTEM ID & make payment to receivers BIOMETRIC UNIQUE COMBINATION IDENTIFICATION SYSTEM ID. The customer can also pay all taxes.
- d) For cash withdrawal from banks the customer will simply login to his BIOMETRIC UNIQUE COMBINATION IDENTIFICATION SYSTEM ID in bank & withdraw cash.
- e) For cash withdrawal in BIOMETRIC UNIQUE COMBINATION IDENTIFICATION SYSTEM Vending machine the customer will go to any BIOMETRIC UNIQUE COMBINATION IDENTIFICATION SYSTEM Vending machine log in, select banking, applicable bank, enter the amount, re authorize & receive cash.
- f) In case of loan application the customer will have to login & apply. Since the BIOMETRIC UNIQUE COMBINATION IDENTIFICATION SYSTEM ID is already verified there is no need of verification. There will be faster processing of loans & customers will get loans on time.
- g) For online shopping the customer will authorize to BIOMETRIC UNIQUE COMBINATION IDENTIFICATION SYSTEM & shop online. Since it is highly safe & secure, no fraud will happen.

FIG. 4 (ii) illustrates the National Security functions of BIOMETRIC UNIQUE COMBINATION IDENTIFICATION SYSTEM Vending Machine, For Security Verification purpose Outdoor BIOMETRIC UNIQUE COMBINATION IDENTIFICATION SYSTEM Authorizers will be installed at all strategically important locations, major entry points, Borders, Check gates. All persons needing to travel through these places will need to authorize themselves on Outdoor BIOMETRIC UNIQUE COMBINATION IDENTIFICATION SYSTEM Authorizers. For a genuine person when authorization will be done green light will glow access will be allowed. For a fake or unauthorized person, illegal migrants or foreign national without any valid permit when authorization will be done red light will glow-access will be denied & siren will be activated. So terrorists can easily be tracked and major security problems can be avoided. For some specific intelligence inputs regarding terrorists in a particular area, an area can be cordoned off & all persons in the area will be authorized and terrorists can easily be tracked. Authorization on Outdoor BIOMETRIC UNIQUE COMBINATION IDENTIFICATION SYSTEM Authorizers will prevent foreign nationals without valid visa to enter our country or over stay. It will make our country more safe & secure.

FIG. 4 (iii) illustrates the Universal ID functions of BIOMETRIC UNIQUE COMBINATION IDENTIFICATION SYSTEM Vending Machine,
- a) In case of applying online for jobs, visa, exams, etc the customer will simply authorize in to his BIOMETRIC UNIQUE COMBINATION IDENTIFICATION SYSTEM ID & apply. The customer will not have to fill the form as all the data are previously present & will be auto filled. The individual will simply choose options what to do. It will also not require verification since BIOMETRIC UNIQUE COMBINATION IDENTIFICATION SYSTEM ID is already verified. It will save time & help the applicant. The examiner will only verify the eligibility criteria. Hence it is reliable & provides fast service.
- b) For pensioners it will be a boon as they don't need to prove themselves as BIOMETRIC UNIQUE COMBINATION IDENTIFICATION SYSTEM ID is already verified. They can easily draw their pensions. It will prevent all pension related frauds.
- c) For poor and affected people it will help immensely as they will simply login to BIOMETRIC UNIQUE COMBINATION IDENTIFICATION SYSTEM ID & draw the compensation. It will prevent any leakage in distribution of relief & subsidy. The relief will reach the affected persons easily & quickly without any leakage. It will also be helpful to govt in determination of the affected people during any calamity. Determination will be fast and easy. It will result is faster relief disbursement and affected people can survive easily. Govt. can effectively monitor who all have received relief & who are remaining. It will prevent affected people from being targeted.

FIG. 5 Show a Portable BIOMETRIC UNIQUE COMBINATION IDENTIFICATION SYSTEM Authorizer connected to a server which is connected to the central data base through internet having a high power 3D face scan & geometry, retina scan, iris scan, no of eye blinks, dental impression, palm scan & geometry, fingerprint, vein print, pulse rate, voice print and average IQ mapping. When a person wants to do transaction in the portable BIOMETRIC UNIQUE COMBINATION IDENTIFICATION SYSTEM Authorizer the authorization process is followed & biometric data is collected. The collected biometric data is encoded & sent to the central data base where it is decoded & matched with the stored data. If the data matches authorization occurs or else authorization fails. It will be used for making payment & authorization. This type of portable BIOMETRIC UNIQUE COMBINATION IDENTIFICATION SYSTEM Authorizer can be installed in shopping malls, hotels & home PC. Portable BIOMETRIC UNIQUE COMBINATION IDENTIFICATION SYSTEM Authorizer will make payments without any card. The customer only has to authorize and make payment. A self check system software is added to the portable BIOMETRIC UNIQUE COMBINATION IDENTIFICATION SYSTEM Authorizer to monitor its working. The identity of the individuals using Portable BIOMETRIC UNIQUE COMBINATION IDENTIFICATION SYSTEM Authorizer will be hidden unless & until security requests are made to disclose.

FIG. 6 (a) illustrates an Outdoor BIOMETRIC UNIQUE COMBINATION IDENTIFICATION SYSTEM Authorizer connected to a server which is connected to the central data base by internet having a 3D face scan & geometry, retina scan, iris scan, no of eye blinks, dental impression, palm scan & geometry, fingerprint, vein print, pulse rate, voice print and average IQ mapping. It will be installed at all strategically important locations such as bus stops, railway stations, popular areas which are valuable to terrorists. All the persons needing to pass through these areas will be required to authorize themselves in the Outdoor BIOMETRIC UNIQUE COMBINATION IDENTIFICATION SYSTEM Authorizer. The collected biometric data is encoded & sent to the central data base where it is decoded & matched with the stored data. A self check system software is added to the Outdoor BIOMETRIC UNIQUE COMBINATION IDENTIFICATION SYSTEM Authorizer to monitor its working.

FIG. 6 (b) illustrates when a genuine person will authorize who is already on the Govt's database green light will glow, gate will open and access will be allowed.

FIG. 6 (c) shows when an unauthorized person, foreign national without valid permit or terrorist will authorize access will be denied, red light will glow & siren will ring. It will immediately alert the security. So major security risks can be avoided. The identity of the individuals using Outdoor BIOMETRIC UNIQUE COMBINATION IDENTIFICATION SYSTEM Authorizer will be hidden unless & until security requests are made to disclose.

FIG. 7 (a) shows the perspective view of creation of a BIOMETRIC UNIQUE COMBINATION IDENTIFICATION SYSTEM ID of a foreign tourist entering our country at the entry point. All the steps in FIG. 1 will be followed. All his required data like time of stay, permit, national, etc are entered in the BIOMETRIC UNIQUE COMBINATION IDENTIFICATION SYSTEM ID. The tourist can avail all the services as per the Govt's tourist rule till the permit expires. It will help the External Affairs Ministry to easily keep track of tourists.

FIG. 7 (b) shows when a foreign national without a valid visa or whose visa has expired will be unable to do anything in our country as his authorization will be denied everywhere by BIOMETRIC UNIQUE COMBINATION IDENTIFICATION SYSTEM Authorizers. So they will ultimately leave our country.

FIG. 8 illustrates the process of authorization of an individual's BIOMETRIC UNIQUE COMBINATION IDENTIFICATION SYSTEM ID. When an individual goes to any authorization device their biometric data such as 3D face scan & geometry, retina scan, iris scan, no of eye blinks, dental impression, palm scan & geometry, fingerprint, vein print, pulse rate, voice print and average IQ mapping is collected. Then security questions are asked. The collected data will be encoded in order to prevent hackers from stealing. The encoded data is then sent to the Central Data Base where it is decoded. The decoded data is then matched with the data stored at the time of enrolment. Matching is done by special type of servers. If-match occurs access is allowed or else for no match access is denied.

Without further elaboration, the foregoing will so fully illustrate my invention, which others may, by applying current or future knowledge; readily adapt the same for use under various conditions of service. It should also be realized by those skilled in the art that such equivalent constructions do not depart from the spirit and scope of the invention.

Advantages Over the Prior Art

The Banking, National Security and Governance with BIOMETRIC UNIQUE COMBINATION IDENTIFICATION SYSTEM of the present invention proposed by the present invention have the following advantages over the prior art:

a) It is cost effective as compared to others available in the market.

b) Freedom from carrying physical ID cards, bank cards, cheques or bonds, there will be no need for memorizing passwords.

c) It has the characteristics of simple structure, convenient to use & high efficiency.

d) It is economical in maintenances.

e) No fear of loss of cards or password and no need to block them on being stolen or lost.

f) For bank, it is safe, secure, and very easy without paperwork it will be accepted by all. Banks can penetrate further & will increase their business. Banks will save millions of rupees from paperwork, manpower, printing, logistic costs etc.

g) By help of BIOMETRIC UNIQUE COMBINATION IDENTIFICATION SYSTEM ID the govt. can achieve 100% financial inclusion, better collection of taxes, better monitoring of schemes, business community & tax defaulter can easily be tracked.

h) BIOMETRIC UNIQUE COMBINATION IDENTIFICATION SYSTEM will prevent benami and fake transaction. It will stop generation and movement of black money as every transaction will require BIOMETRIC UNIQUE COMBINATION IDENTIFICATION SYSTEM authorization.

i) Improve resistance to fraud and abuse by assuring that users are genuine, and entitled to the services they are claiming.

In the preceding specification, the invention has been described with reference to specific exemplary embodiments thereof. It will be evident that various modifications and changes may be made thereunto without departing from the broader spirit and scope of the invention as set forth in the claims that follow. The specification and drawings are accordingly to be regarded in an illustrative rather than restrictive sense. Therefore, the aim in the appended claims is to cover all such changes and modifications as fall within the true spirit and scope of the invention. The matter set forth in the foregoing description and accompanying drawings is offered by way of illustration only and not as a limitation. The actual scope of the invention is intended to be defined in the following claims when viewed in their proper perspective based on the prior art.

I claim:

1. A universal identification system comprising:
    a biometric identification system configured to create a biometric unique combination identification system identifier ("BUCIS id") for each individual, wherein the BUCIS id comprises a unique combination of parameters, wherein the parameters include a face scan, face geometry, retina scan, iris scan, number of eye blinks per second, an ear print, a dental impression, a palm scan, a palm geometry, a fingerprint, a vein print, a pulse rate, a voice print, an average IQ mapping, the average IQ mapping comprising a unique score obtained by answers received by the each individual to a plurality of aptitude questions and reasoning, of the each individual;
    a central database configured to store a plurality of details and the unique combination of parameters of the each individual, wherein the plurality of details comprises a plurality of banking details, identity details, service details, passport, visa details, a set of permissions from the government, a plurality of scanning details, and the unique combination of parameters; and wherein the plurality of details and the unique combination of parameters is received from the biometric identification system;
    a banking biometric unique combination identification system vending machine coupled to the central database and configured to facilitate deposit and withdrawal of cash from a financial account associated with the each individual based on one or more biometric data scanned from the each individual;
    a universal governance biometric unique combination identification system coupled to the central database configured to automatically facilitate filling of a plurality of governance-related forms for performing a plurality of functions, wherein the plurality of functions comprises applying to exams, applying for visas, withdrawal of pensions, and compensation on login by an individual;
    an outdoor biometric unique combination identification authorizer situated at a plurality of outdoor, pre-defined locations, the outdoor biometric unique combination identification authorizer coupled to the central database via a server and configured to scan, encode, and send a plurality of parameters of an individual to the central database and match the plurality of parameters with the BUCIS id of the individual stored in the central database, and permit entry or access for the individual into a location based on applicable criteria of the location; and
    a portable biometric unique combination identification system authorizer (500) coupled to the central database via the server and configured to scan a plurality of biometric data of the individual, decode and send a plurality of scanned parameters of an individual to the central database, access a plurality of financial parameters corresponding to the individual based on the plurality of biometric data from the central database, match the plurality of biometric data of the individual with the plurality of financial parameters corresponding to the individual, and upon successful matching authorize and facilitate one or more financial purchase transactions.

2. The universal identification system of claim 1, wherein a portion of the plurality of details is stored in an encrypted part in the central database and another portion of the plurality of details and the unique combination of parameters is stored in a non-encrypted part.

\* \* \* \* \*